United States Patent
Carrasco Vergara

(10) Patent No.: US 9,108,699 B2
(45) Date of Patent: Aug. 18, 2015

(54) CRANK ARM SPIDER IMPROVEMENT FOR ATTACHING OVOID CHAINRINGS

(71) Applicant: Rotor Componentes Tecnologicos S.L., Madrid (ES)

(72) Inventor: Pablo Carrasco Vergara, Madrid (ES)

(73) Assignee: Rotor Componentes Tecnologicos S.L., Madrid (ES)

( * ) Notice: Subject to any disclaimer, the term of this patent is extended or adjusted under 35 U.S.C. 154(b) by 0 days.

(21) Appl. No.: 14/370,809

(22) PCT Filed: Jan. 9, 2013

(86) PCT No.: PCT/EP2013/050295
§ 371 (c)(1),
(2) Date: Jul. 7, 2014

(87) PCT Pub. No.: WO2013/104663
PCT Pub. Date: Jul. 18, 2013

(65) Prior Publication Data
US 2015/0000460 A1    Jan. 1, 2015

(30) Foreign Application Priority Data
Jan. 11, 2012 (ES) .................. 201200021

(51) Int. Cl.
*B62M 3/00* (2006.01)
*B62M 3/16* (2006.01)
*B62M 9/02* (2006.01)
*B62M 9/08* (2006.01)
*B62M 9/00* (2006.01)

(52) U.S. Cl.
CPC . *B62M 3/16* (2013.01); *B62M 9/00* (2013.01); *B62M 9/02* (2013.01); *B62M 9/08* (2013.01); *B62M 2009/002* (2013.01); *Y10T 74/2165* (2015.01)

(58) Field of Classification Search
CPC .... B62M 3/06; B62M 1/36; B62M 2003/006; B62M 3/003; G05G 1/30
See application file for complete search history.

(56) References Cited

U.S. PATENT DOCUMENTS

| 515,449 | A | * | 2/1894 | Scovell | 474/141 |
| 3,899,932 | A | * | 8/1975 | Durham | 474/141 |
| 4,201,120 | A | * | 5/1980 | Segawa | 74/594.2 |

(Continued)

FOREIGN PATENT DOCUMENTS

| DE | 3712794 A1 | * | 10/1988 |
| FR | 2493257 A1 | * | 5/1982 |

*Primary Examiner* — Vicky Johnson
(74) *Attorney, Agent, or Firm* — Marguerite Del Valle

(57) ABSTRACT

Crank arm spider adjustment orientation system to provide different angular orientations in the attachment of at least an ovoid chainring, comprising an ovoid chainring (3) and a spider (1), both of them provided with multiple anchorage points (30, 10) arranged as holes distributed along the perimeter of a BCD, and mechanical anchorage means (5) engaging chainring anchorage points (30) with corresponding spider anchorage points (10); where the number of said spider anchorage points (10) is multiple of and greater than the number of said mechanical anchorage means (5), and the angular increment between consecutive chainring's (3) orientations provided by the chainring anchorage points (30) is different than the angular increment between consecutive chainring's (3) orientations provided by the spider anchorage points (10), so the combination of the spider (1) with at least one ovoid chainring (3) multiplies the possibilities for said ovoid chainring's (3) orientation reducing the angular increment between consecutive chainring's (3) orientations.

10 Claims, 9 Drawing Sheets

(56) References Cited

U.S. PATENT DOCUMENTS

| | | | |
|---|---|---|---|
| 4,522,610 A * | 6/1985 | Nagano | 474/141 |
| 5,549,314 A * | 8/1996 | Sassi et al. | 280/259 |
| 7,749,117 B2 * | 7/2010 | Carrasco Vergara | 474/152 |
| 2009/0280937 A1 * | 11/2009 | Greene | 474/78 |

* cited by examiner

CRANK ARM SPIDER IMPROVEMENT FOR ATTACHING OVOID CHAINRINGS

The present invention relates to a bicycle crank arm capable to attach in different angular positions to non-circular chainrings, in which the orientation or relative position between a major chainring diameter and the crank arm direction is a fundamental parameter in the optimization of pedaling biomechanics.

PRIOR ART

The crankset is the component of a bicycle drivetrain that converts the reciprocating motion of the rider's legs into rotational motion used to drive the chain, which in turn drives the (usually) rear wheel. It comprises one or more chainrings attached by means of a spider to one of the two crank arms, to which the pedals attach. This crankset is connected to the rider by the pedals, to the bicycle frame by the bottom bracket bearings, and to the rear sprocket, cassette or freewheel via the chain.

The two crank arms, one on each side and usually mounted 180° out of phase, connect the bottom bracket axle to the pedals. And the spider is usually a multi-armed piece that connects the chainring to one of the two crank arms called drive-side crank arm, and therefore to the bottom bracket spindle. This spider may be a separate removable piece of the crank arm or an integrated spider on the drive-side crank arm.

On the bicycle, the rider applies the power in the two pedals. These are mounted on the ends of both crank arms which are connected to each other through the bottom bracket spindle. The drive-side crank arm incorporates one or several chainrings, which are toothed wheels to give traction to the rear wheel by means of chain and sprockets on said wheel.

While most bicycles use circular chainrings, to increase pedaling efficiency many cyclists choose ovoid chainrings, for which a major diameter can be defined. In this case we can talk about the orientation parameter, defined as the angle existing in the direction of pedaling between the major chainring diameter and the plane containing both crank arms.

Many bicycles have removable chainrings, to allow for replacement when worn or to change the gear ratio provided. The spider arms used for attaching a chainring can have a variety of dimensions, referred to as the bolt circle diameter (BCD). Cranks designed to mount one or two chainrings will almost always use a single bolt circle diameter. Cranks designed to mount three chainrings will almost always use two different bolt circle diameters, the larger to mount the two outer rings and the smaller to mount the inner ring. Normally spider and chainrings are provided with holes in order to arrange said bolts and corresponding nuts.

Must be mentioned that numerous documents and patents discloses the advisability of using non-circular chainrings, sometimes very different ones from each other, but all those can be included under the common noun of "ovoid chainrings". Most of them offer specific orientations to achieve in each case a possible biomechanics improvement; however in some cases, in order to optimize its use, they enables the orientation adjustment, and to that end the chainring has been provided with a multiplicity of holes to attach to a crank arm spider by means of screws. So the user can choose between different orientations for the same chainring. This is the case of patents: FR1090949, DE8809795, FR974415A, FR2295867A1, FR2471906A1, and EP1863699, the latter document of the same inventor and applicant corresponding to the present invention.

By providing an ovoid chainring with different optional orientations, this can be applied to bicycles with different geometries or uses. However, when it is required a fine adjustment to optimize the biomechanics, the angular increments corresponding to the different orientation options must be small enough to provide a solution for the largest number of cyclists. It is in this case in which the present invention will focus.

The document EP1863699 discloses three arrangement solutions providing different orientation options when attaching ovoid chainrings with conventional screws and nuts:

a) Independent holes placed at alternate end points of separated diameters located perimetrically opposed in the chainring (solution shown in FIG. 5 of that document). So, the angular increment given between two consecutive orientation options is half the angular spacing corresponding to two adjoining holes, because if we take a bolt circle diameter with one end between two adjoining holes, in the opposite end we always find a hole that defines that intermediate orientation with respect to the two adjoining holes. This solution is only possible when the crank arm has an odd number of anchorage points for the chainring. In that specific case of the figure, we have angular increments of 5.14°.

b) Overlapped holes for the angular increment given between two consecutive orientation options, separated as small as possible (solution shown in FIG. 8 of that document). In that case there are larger angular increments, in particular of 8°, due to the even number of anchorage points to the crank arm.

c) Overlapped holes placed at alternate end points of separated diameters located perimetrically opposed in the chainring, so that the angular increment given between two consecutive orientation options is half the angular spacing corresponding to two consecutive overlapped holes (solution shown in FIG. 9 of that document). This solution, combination of the two previously described, it is only possible when the spider has an odd number of anchorage points for the chainring. In that case we have angular increments of 4°.

The experience both in competition and market has shown however, that an adjustment for the orientation involving angular increments around 8° makes unviable adjusting the biomechanics, despite the convenience of these particular increments to adjust the chainring to the different bicycle geometries or to the various cycling disciplines (cross-country, downhill mountain biking, BMX, road racing, cyclocross . . . ). Although there are cyclists who adjust the orientation of the chainrings to improve their biomechanics with angular increments of approximately 5°, standing at one extreme the natural sprinters and at the opposite the pure climbers, the increment is still too high to be valid for most cyclists, because these increments correspond to very different cycling styles.

More recently the patent application PCT/EP2011/003325, referring the same inventor and applicant than the present invention, disclose the construction of ovoid chainrings whose orientation can be adjusted with lower angular increments due to the arrangement of the anchorage points as overlapped holes with a staggered depth, allowing having new ovoid chainrings with a more adequate regulation range. In the case of a crank arm spider with an odd number of anchorage points, we can achieve suitable angular increments until 3 degrees.

It should be emphasized that the orientation between a chainring and a crank arm may depend on both the construction of the chainring having several anchorage alternatives, as to the spider attaching to the crank arm. Concerning to that, we can see in document EP1863699 (FIG. 10) that multiple orientations can be achieved using a spider which may be coupled to the corresponding crank arm in different positions. However, in this latter case to change the relative position between the spider and the crank arm is not a simple maintenance operation than a user can do with common tools in a bicycle ride, but it is a specialized mechanic's job inasmuch as it would require even remove the crank of the bicycle, so far it has not been a real option in the bicycle market.

SUMMARY OF THE INVENTION

The technical problem to be solved by the present invention is to reduce the angular increment between consecutive angular orientations of an ovoid chainring with respect to the crank arm axis, in order to multiply the number of different chainring angular positions.

It is known a main scale fixing angular orientation increments by using multiple anchorage points arranged on the ovoid chainring itself (disclosed in documents from the same applicant EP1863699 and EP2595869) in order to provide an ovoid chainring with different orientation settings (varying the angle existing between the major axis of said ovoid chainring and the plane containing both crank arms), but this solution has a structural limitation of minimum 3° because this angular increment is limited by the distance between axes of the holes made in the chainring. This angle limit must be reduced in order to optimize the pedaling biomechanics. However, the solution consisting of further approaching the consecutive holes to decrease said angular increment by overlapping holes, does not meet the resistance and rigidity features required in the anchorage points between chainring and crank arm spider for transmitting power, because these holes must be sufficiently separated so that between them there is enough material to guarantee the tangential attachment in order to bear its corresponding mechanical anchorage means, so working under load, these means does not slide to the adjoining hole by breaking or deforming the material.

Therefore, the present application provides a solution to this technical problem providing a more accurate adjustment orientation system in order to complement the divisions of a main scale arranged in an ovoid chainring via the chainring anchorage points, combining it with a second auxiliary scale arranged in the spider via the spider anchorage points which is able to rotate relative to the main scale thus multiplying the number of different chainring angular positions and reducing the angular increment between consecutive chainring's (3) orientations below 3°.

The object of the present invention is to obtain an overall improvement in the biomechanics of pedaling, ranging the orientation between the ovoid chainring and the crank arm direction by means of an improved arrangement of the crank arm spider. This spider could be attached to one or more ovoid chainring using mechanical anchorage means, usually screws and nuts.

To this end, we propose a crank arm spider which may be either removable or not from the drive-side crank arm. Said spider is provided with a multiplicity of spider anchorage points for attaching chainrings, being the number of said spider anchorage points multiple of the number of the mentioned mechanical anchorage means, thus allowing different orientations when it incorporates ovoid chainrings.

These spider anchorage points are usually holes arranged along a spider perimeter corresponding to the aforementioned bolt circle diameter, and in this case as we multiply them looking for different orientations, depending on the angular increment between holes corresponding to the different orientation options, they may be either independent holes or overlapped holes.

In the particular case of chainrings provided with odd number of chainring anchorage points in order to minimize the angular increment between two consecutive orientations, the corresponding spider anchorage points could be holes arranged not adjoining but opposite to the perimeter and separated them 180° minus the aforementioned increment.

The present invention discloses different possibilities: firstly, it provides a crank arm spider adjustment orientation system for usual ovoid chainrings which lack of their own orientation adjustment means; and secondly, we get a major advantage by combining this spider solution with ovoid chainrings provided themselves with an adjustment orientation system, multiplying the resulting orientations, avoiding the structural restrictions and providing a chainring angular orientation ranging small increments for allowing the users to always find a satisfactory individual orientation. So, with this disclosed arrangement we can achieve all desired orientations, from the point of view of the biomechanical performance, in sport or even scientific research level.

Thus, a chainring could be adapted to any kind of cyclist, searching for a sporting improvement but also for an increase in the health of the cyclist' knees when avoiding stress peaks are the main purpose.

DETAILED DESCRIPTION OF A PREFERRED EMBODIMENT

Figure 1:
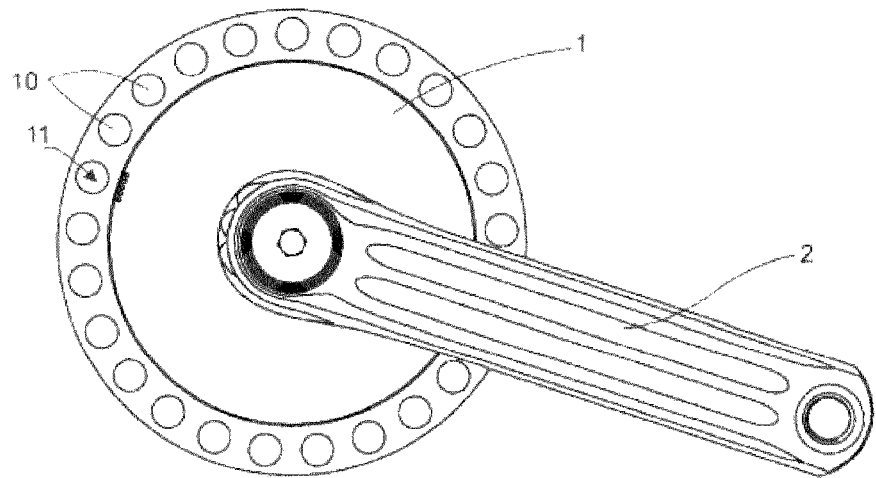
FIG. 1 shows a bicycle crank arm (2) whose spider (1) is provided with multiple spider anchorage points (10) for attaching ovoid chainrings (3) provided with their own means for orientation adjustment. In addition, it shows the reference spider anchorage point (11), which corresponds to the commonly used in a conventional spider.

Referring to a crank arm spider, it is proposed a crank arm spider adjustment orientation system to provide different angular orientations in the attachment of at least one ovoid chainring, consisting of, at least an ovoid chainring (3) having a major diameter, whose angle with a crank arm (2) measured in the pedaling direction defines its orientation, and provided with a number of chainring anchorage points (30) arranged as holes distributed along the perimeter corresponding to a chainring bolt circle diameter in order to attach the ovoid chainring (3) to a crank arm (2) in a plurality of angular orientations; a spider (1) coupled to said crank arm (2), provided with a plurality of spider anchorage points (10) arranged as holes distributed along the perimeter corresponding to a spider bolt circle diameter in order to attach the ovoid chainring (3) in a plurality of angular orientations; and mechanical anchorage means (5), usually screws and nuts, in order to make integral said ovoid chainring (3) with said spider (1), allowing the chainring orientation to be selectively regulated by the user, where the number of the chainring anchorage points (30) is multiple of and greater than the number of said mechanical anchorage means (5) so it can be defined some as original chainring anchorage points for attaching a spider (1), and the rest as alternative chainring anchorage points, so said alternative chainring anchorage points are located in an angular position different from 180° with respect to the mentioned original chainring anchorage points, providing multiple possibilities for the ovoid chainring's (3) orientation; and where the number of said spider anchorage points (10) is multiple of and greater than the number of said mechanical anchorage means (5) so it can be defined some as original spider anchorage points (10) common to other conventional spiders, and the rest as alternative spider anchorage points (10), so said alternative spider anchorage points are located in an angular position different from 180° with respect to the mentioned original spider anchorage points, providing multiple possibilities for the ovoid chainring's (3) orientation. The above mentioned angular increment between consecutive chainring's (3) orientations provided by the chainring anchorage points (30) is different from the angular increment between consecutive chainring's (3) orientations provided by the spider anchorage point (10), so the combination of the aforementioned spider (1) with said ovoid chainring (3) multiplies the possibilities for said ovoid chainring's (3) angular orientation, reducing the angular increment between consecutive angular orientations with respect to the crank arm (2).

In another preferred embodiment of the present invention, the spider anchorage points (10) that correspond to the same chainring anchorage point (30) are arranged in the spider (1) as slotted holes.

The aforementioned ovoid chainring (3) has a major diameter that forms an angle with respect to the plane containing the two bicycle crank arms (2), measured in the pedaling direction, which defines its orientation. It is defined the reference orientation corresponding to a particular angular attachment position between the spider (1) and the ovoid chainring (3) marked by a reference spider mark (12) and a corresponding reference chainring mark (32). So said ovoid chainring (3) may therefore be adjusted in orientation by the user, who can choose the chainring orientation attaching it to the original spider anchorage point (10) including the reference spider anchorage point (11), or choosing another alternative orientation close to the reference orientation, when the chainring (3) is attached to the alternative spider anchorage points (10).

Due to the aforementioned combination of at least said ovoid chainring (3) with a plurality of chainring anchorage points (30) coupled to a spider (1) provided with multiple spider anchorage points (10), the angular increment between consecutive chainring's (3) orientations options is smaller than or equal to 3°. Furthermore, in another preferred embodiment the mentioned angular increment is smaller than or equal to 2°, or even smaller than or equal to 1° as it is following disclosed.

Figure 2:
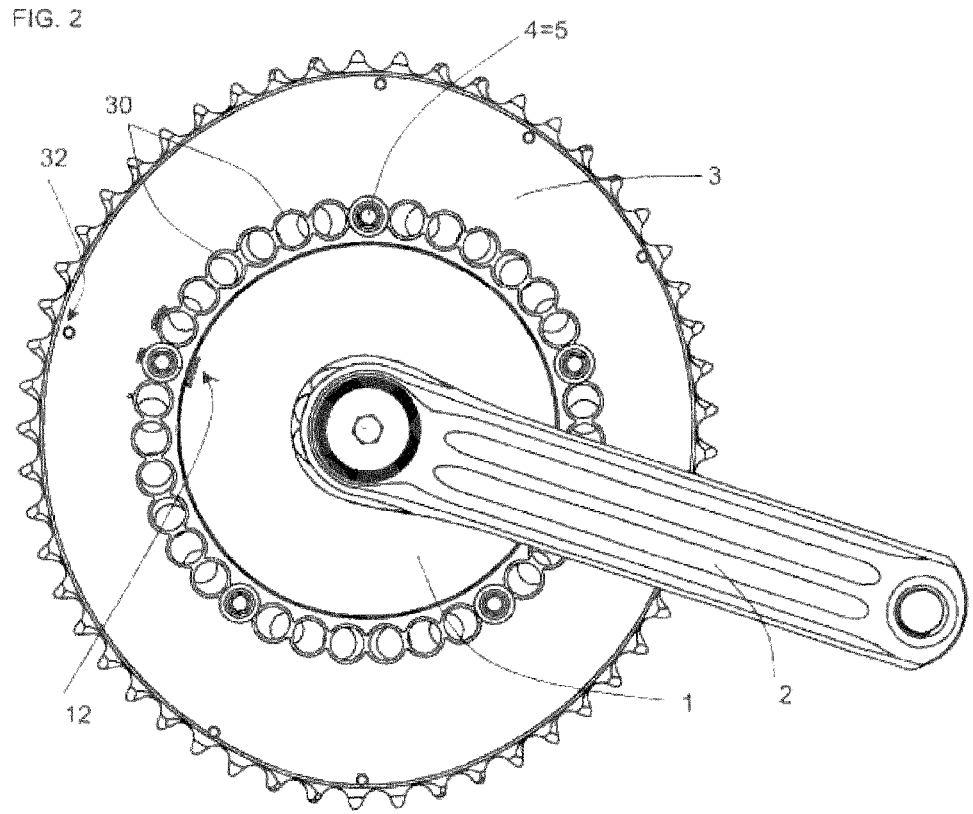
FIG. 2 shows the bicycle crank arm (2) and the spider (1) of FIG. 1 attached to an ovoid chainring (3) by means of mechanical anchorage means (5) arranged as screws and nuts (4) in a reference orientation marked by a reference spider mark (12) and a corresponding reference chainring mark (32).
Figure 3:
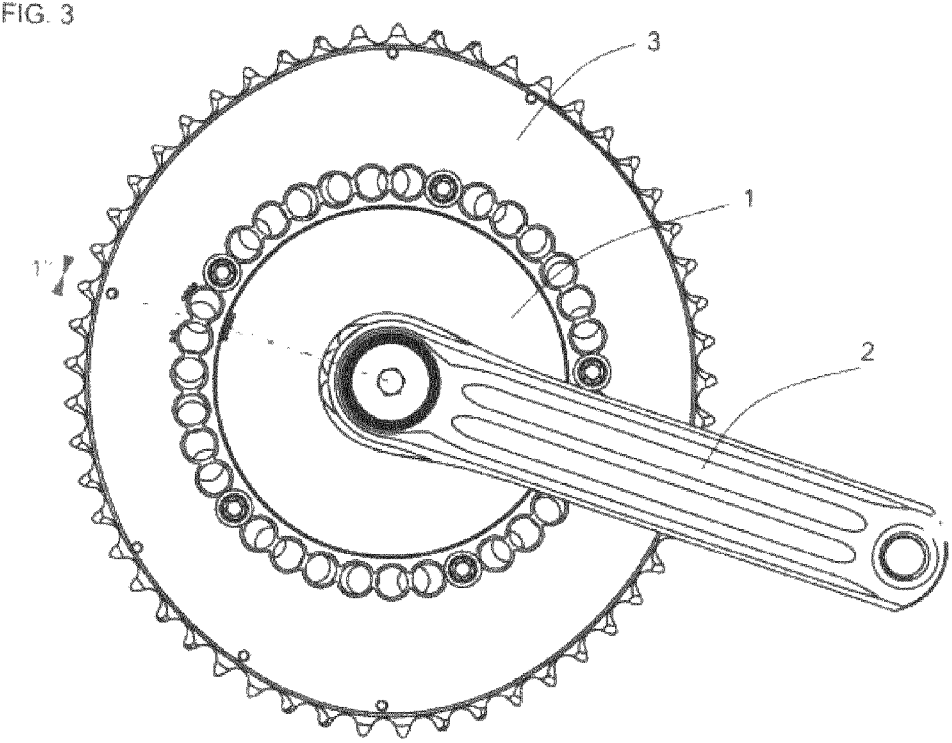
FIG. 3 shows the bicycle crank arm (2), the spider (1) and the ovoid chainring (3) of FIG. 2 attached in a different orientation, which is counterclockwise (CCW) rotated roughly 181°, so the chainring orientation has varied 1° with respect to FIG. 2.
Figure 4:
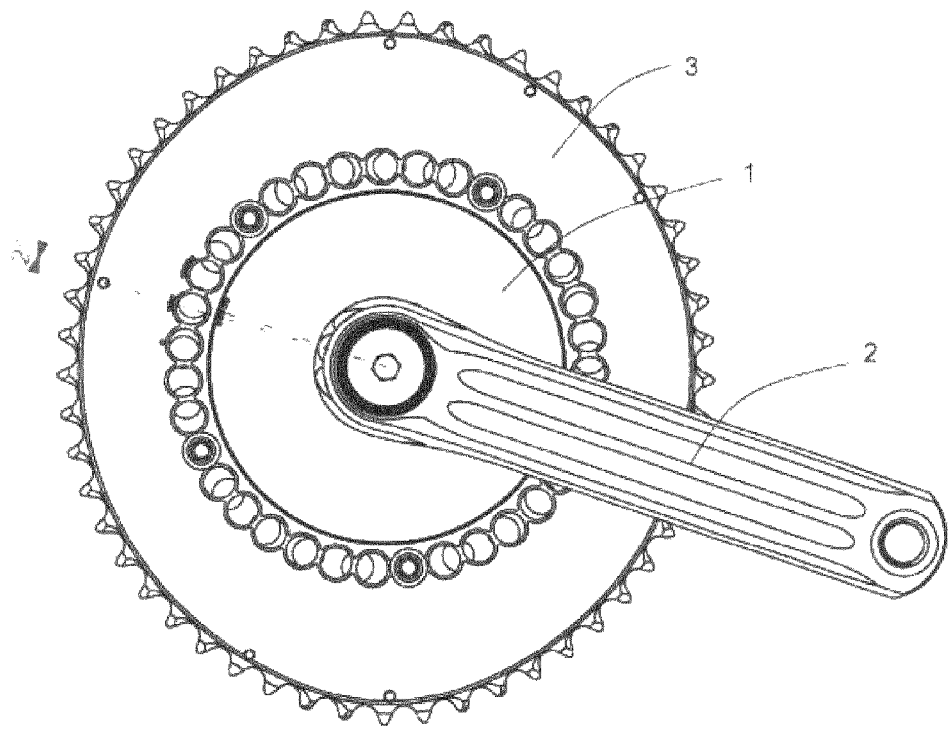
FIG. 4 shows the bicycle crank arm (2), the spider (1) and the ovoid chainring (3) of FIG. 2 attached in another different orientation, which is counterclockwise rotated roughly 2°, so the chainring orientation has varied 2° with respect to FIG. 2.

Specifically, it is proposed (FIG. 1) a spider (1), for a bicycle crank arm (2), provided with 25 spider anchorage points (10) arranged as independent holes equally spaced 14.4° in a 130 mm bolt circle diameter (BCD). And it is also proposed said spider (1) attached to an ovoid chainring (3) by means of 5 mechanical anchorage means (5). Said chainring (3) is also provided with 35 chainring anchorage points (30) approximately equally spaced 10'29°, so this provides orientation angular increments of approximately 1.03°. FIGS. 2, 3 and 4 show said crankset but with three consecutive orientations, thus allowing the chainring (3) position varies 1'03° from one chainring to another in counterclockwise. This is a very small increment, and should be primarily recommended for use in scientific applications.

Figure 5:
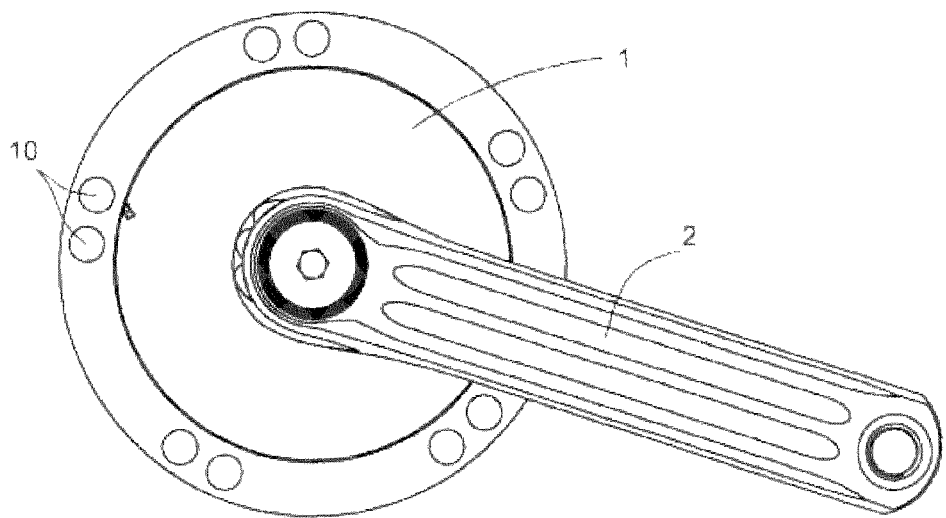
FIG. 5 shows another embodiment of a bicycle crank arm (2) whose spider (1) is provided with a number of spider anchorage points (10), which is twice the number of the mechanical anchorage means (5), so they are arranged as independent holes grouped in pairs.
Figure 6:
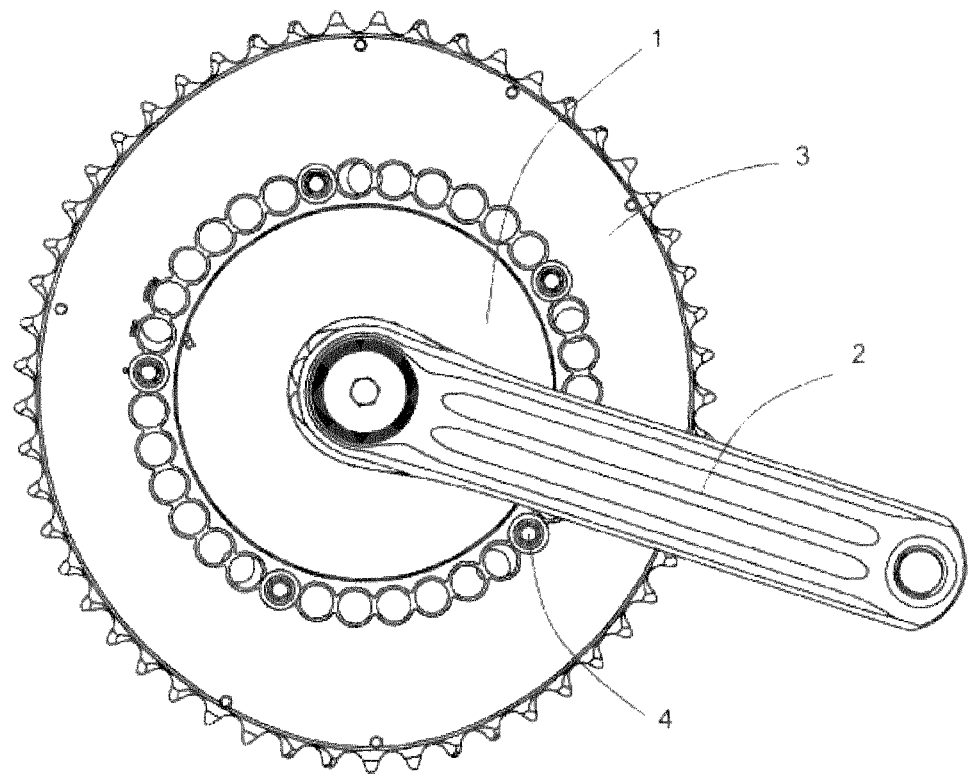
FIG. 6 shows the bicycle crank arm (2) and the spider (1) of FIG. 5 attached to an ovoid chainring (3) by means of 5 screws and nuts (4) in an orientation that is approximately CCW 2.6° far from the abovementioned reference orientation of FIG. 2, which is exactly half the minimum increment orientation that it can be achieved by using only the adjustment means provided in this ovoid chainring (3).

It is also proposed (FIG. 5, 6) a spider (1), or a crank arm (2) coupled to said spider (1) which is a simplification of the previous mentioned because it is provided with double number of spider anchorage points (10) than the number of the mechanical anchorage means (5), naming 5 of them original spider anchorage points (10) and the resting 5 alternative spider anchorage points (10), being separated 12'86° the original ones from the alternative ones. So, there is only one alternative attachment in the spider to adjust the chainring (3) orientation. But when it is used in combination with ovoid chainrings (3) which are also provided with multiple anchorage points to the spider (1) with a 10'29° gap between them, we can achieve intermediate orientation values of 2.57° instead of 5.14° corresponding when it is used said ovoid chainring (3) attaching a standard spider (1) with 5 holes (3).

Figure 7:
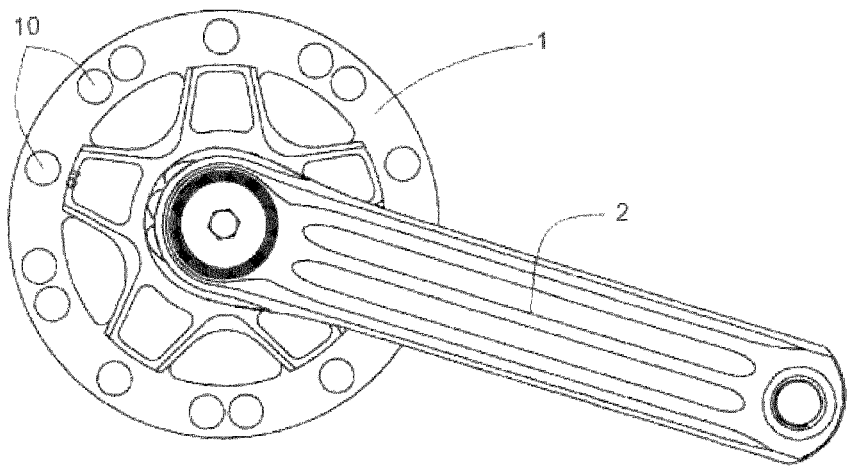
FIG. 7 shows another embodiment of a bicycle crank arm (2) whose spider (1) is provided with multiple spider anchorage points (10) for attaching smaller "compact" ovoid chainrings.
Figure 8:
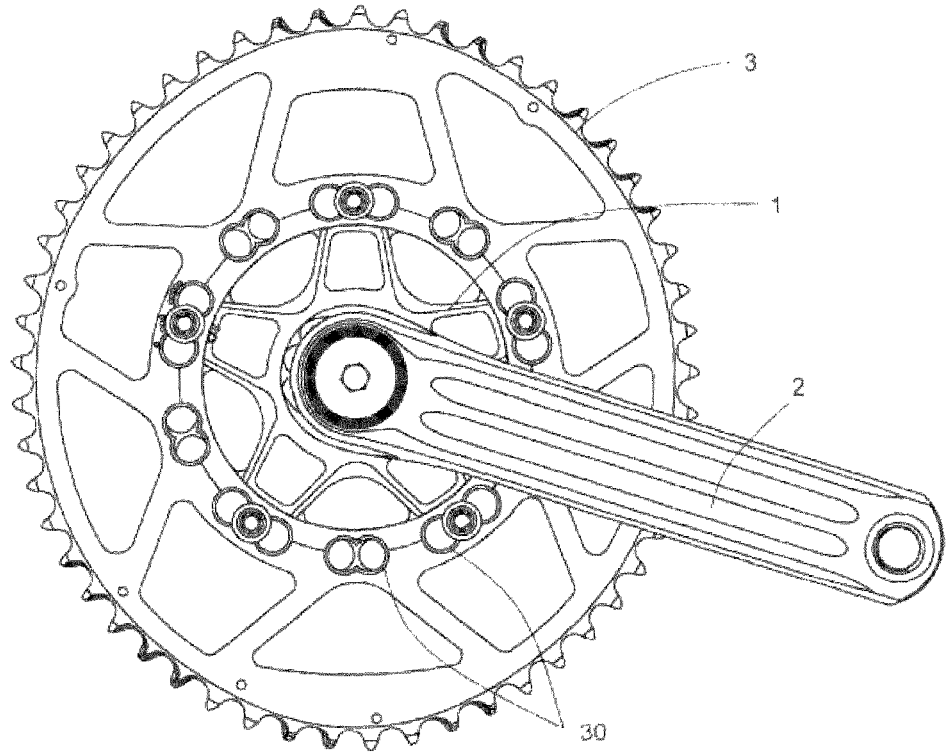
FIG. 8 shows the bicycle crank arm (2) and the spider (1) of FIG. 7 attached to an ovoid chainring (3) which also has its own means for adjusting the orientation by means of its own chainring anchorage points (30). And due to this combination of both adjustment means, the angular increment between different orientation options is reduced to 2°.

In the case of "compact" crank arms (2) (FIG. 7, 8) it is proposed a spider (1) with spider anchorage points (10) for attaching chainrings (3) located on a 110 mm bolt circle diameter (BCD). Said arrangement combines perfectly with an ovoid chainring (3) provided with its own chainring anchorage points (30) arranged forming groups of overlapped holes. So only using the ovoid chainring (3) we achieve to adjust the orientation every 4°; but if we combine said ovoid chainring (3) with the aforementioned spider (1) we can achieve to adjust the orientation every 2°.

Figure 9:
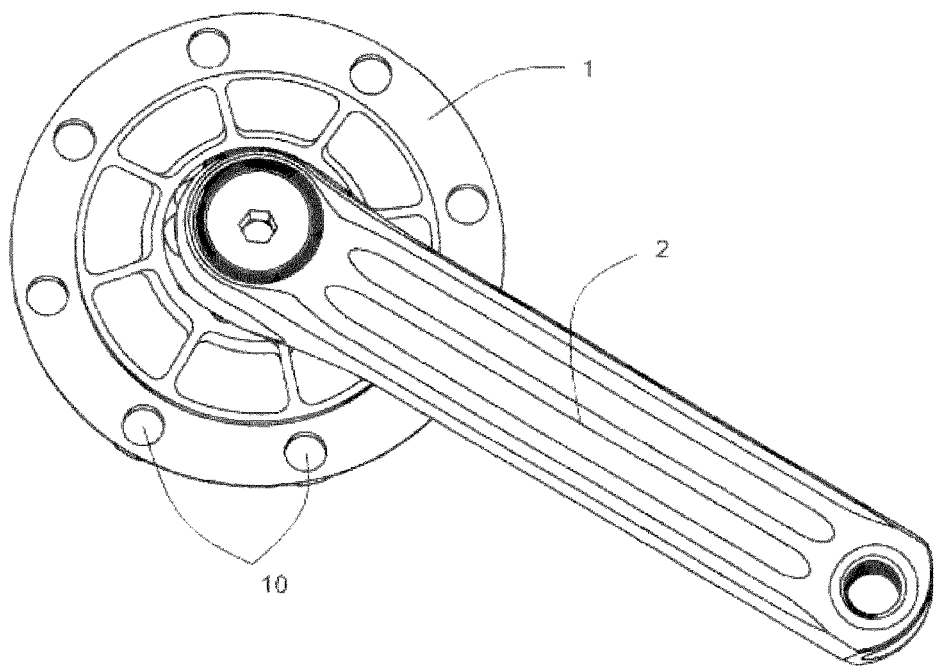
FIG. 9 shows another embodiment for a "mountain bike" crank arm (2) whose spider (1) is provided with multiple spider anchorage points (10) for attaching smaller ovoid chainrings in different orientations.
Figure 10:
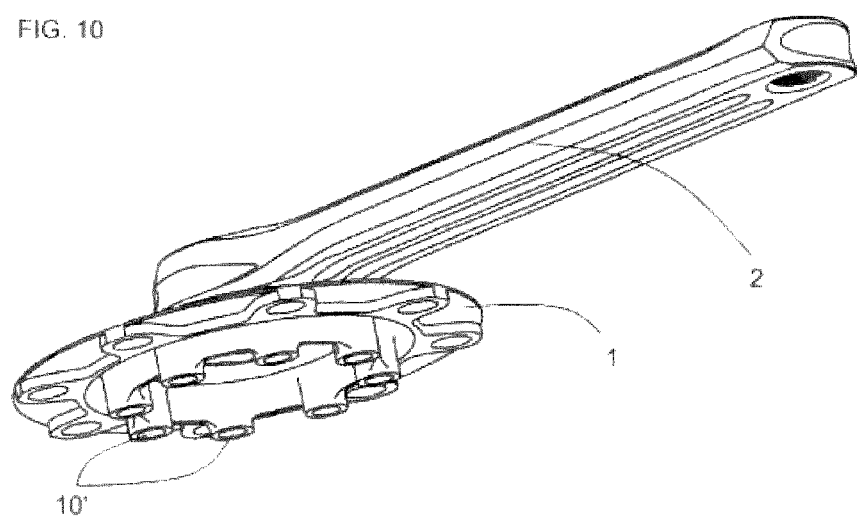
FIG. 10 shows the "mountain bike" crank arm (2) and the spider (1) of FIG. 9 from another perspective, appreciating other multiple spider anchorage points (10') on the internal side of the spider (1) arranged in a smaller BCD in order to fix smaller ovoid chainrings.
Figure 11:
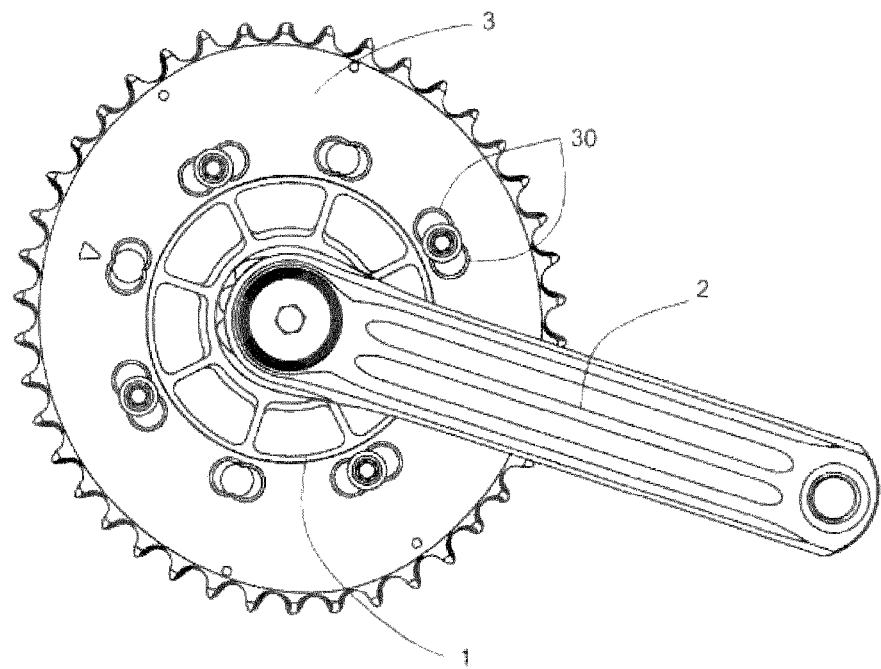
FIG. 11 shows the "mountain bike" crank arm (2) and the spider (1) of FIG. 9 attached to an ovoid chainring (3) which is also provided with its own chainring anchorage points (30) for adjusting the orientation. And due to this combination of both adjustment means, the angular increment between different orientation options is reduced to 3°.

In the case of "Mountain Bike" crank arms (2) (FIG. 9, 10, 11) where spiders (1) attaches three chainrings (3), the outer two with 4 screws on a 104 mm bolt circle diameter (BCD), and the smallest inside with another 4 screws on a 64 mm bolt circle diameter (BCD), it is proposed a spider (1) with 8 spider anchorage points (10) for attaching chainrings (3) arranged as independent holes positioned on a 104 mm bolt circle diameter (BCD), and 8 other spider anchorage points (10') in the inner chainring (3) side on a 64 mm bolt circle diameter (BCD). This spider (1) is used in combination with an ovoid chainring (3) provided with its own chainring anchorage points (30) arranged as 20 adjoined and overlapped holes grouped together in 8 groups. So, it is achieved to adjust the orientation every 6° only with a chainring (3), but combining it with this spider (1) it is achieved to adjust the orientation every 3°.

Figure 12:
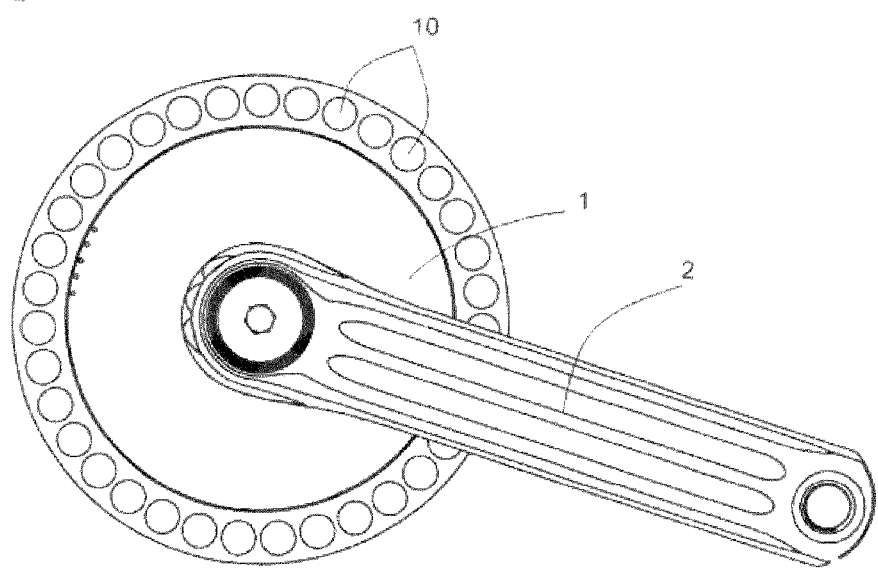
FIG. 12 shows a bicycle crank arm (2) whose spider (1) is similar to that shown in FIG. 1 as it is provided with multiple spider anchorage points (10) arranged as independent holes much closer together, in order to attach ovoid chainrings which lacks of its own means to adjust the orientation.
Figure 13:
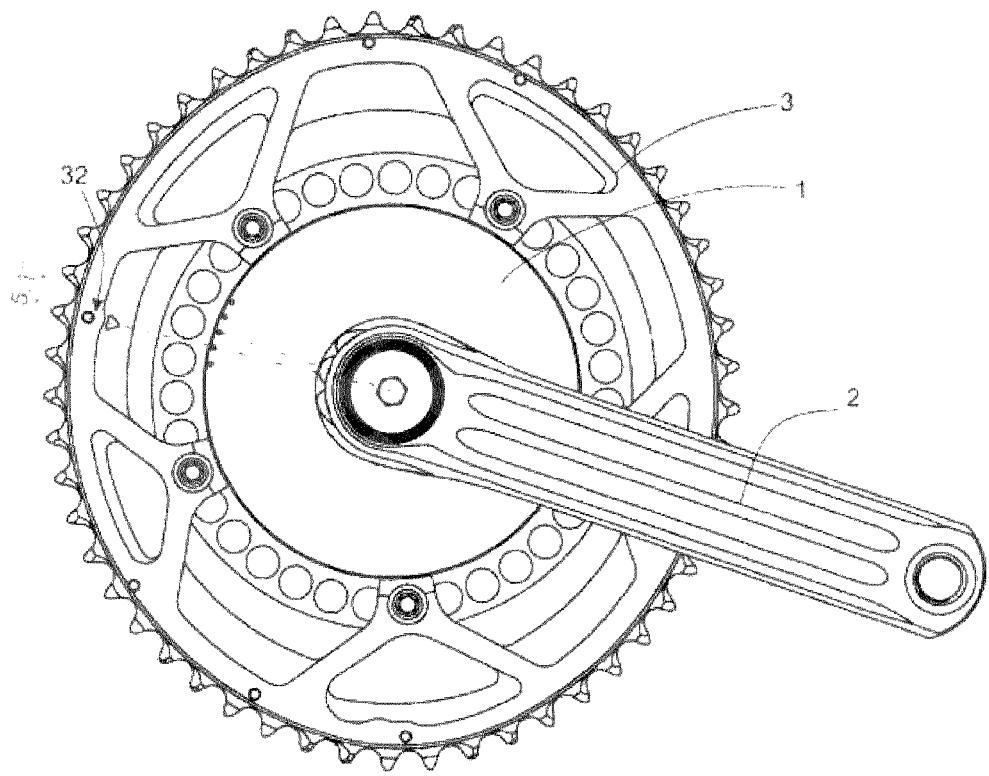
FIG. 13 shows the bicycle crank arm (2) and the spider (1) of FIG. 12 attached to an ovoid chainring (3) in an orientation that is CCW approximately 5'1° far from the reference orientation of FIG. 2, this being the minimum angular increment possible with this arrangement.

When it comes to adjust the orientation of an ovoid chainring (3) which is not provided with its own adjusting means it should be provided on the spider (1) multiple spider anchorage points (10) arranged very close together. In order to obtain this, we propose two possibilities:

A spider (1) (FIG. 12, 13) provided with 35 spider anchorage points (10) equally spaced along a perimeter, achieving orientation angular increments of 5.14°.

Figure 14:
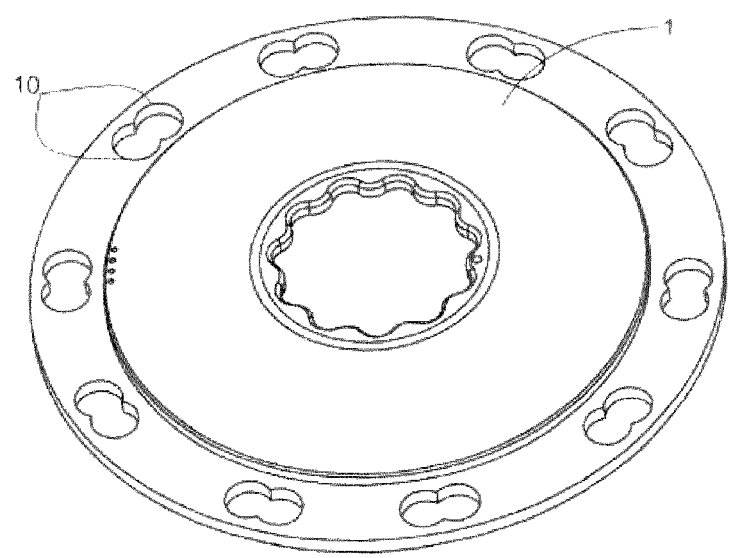
FIG. 14 shows a spider (1) where the spider anchorage points (10) are adjoined holes separated 6°, so they are so close together that are grouped overlapped in pairs; resulting four different orientations separated 3° between them.
Figure 15:
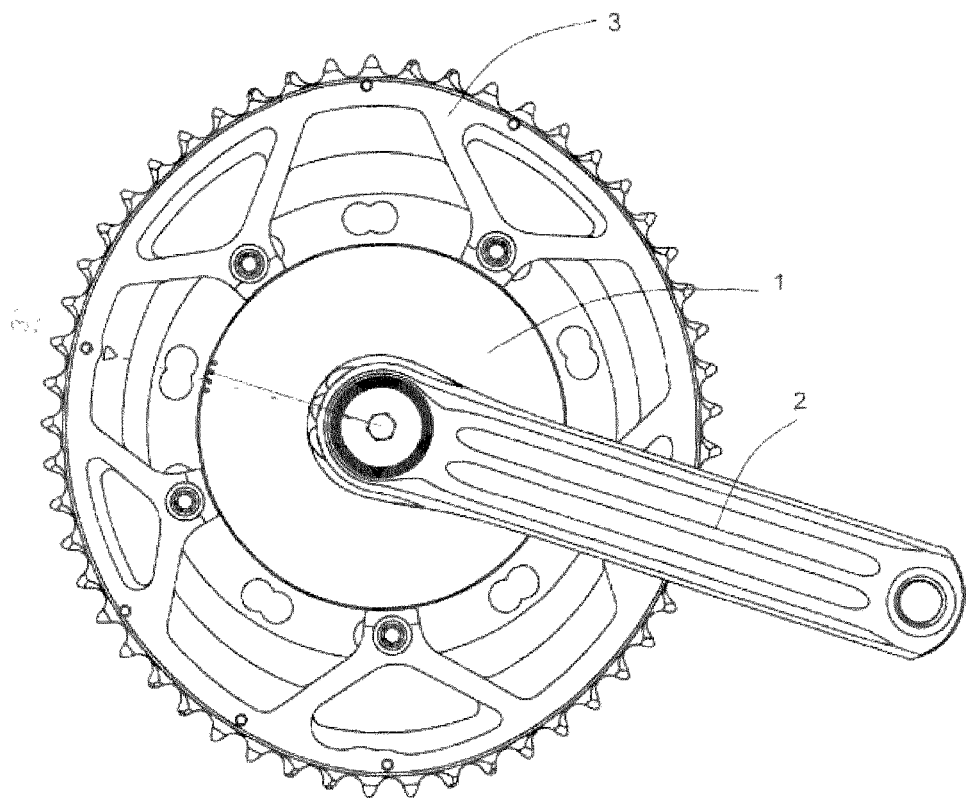
FIG. 15 shows the bicycle crank arm (2) and the spider (1) of FIG. 14 attached to an ovoid chainring (3) in an orientation that is CCW 3° far from the reference orientation of FIG. 2.

A spider (1) (FIG. 14, 15) provided with spider anchorage points (10) placed at alternate end points of a diameter forming groups of overlapped holes. As the distance between said overlapped holes is 6°, it is obtained 4 orientation options with a distance between them of 3°.

OTHER EMBODIMENTS

In cases where adjusting the orientation of ovoid chainrings (3) continuously within a certain angular range is required, it is proposed a crank arm spider improvement for attaching one or more ovoid chainrings (3), comprising: a spider (1) forming a structure with spider anchorage points (10) to make integral with the crank arm (2), and mechanical anchorage means (5) in order to attach said spider (1) to said chainrings (3), so that the aforementioned spider anchorage points (10) that correspond to the same chainring anchorage point (30) are arranged as slotted holes located in a perimeter corresponding to a bolt circle diameter of said spider (1).

Figure 16:
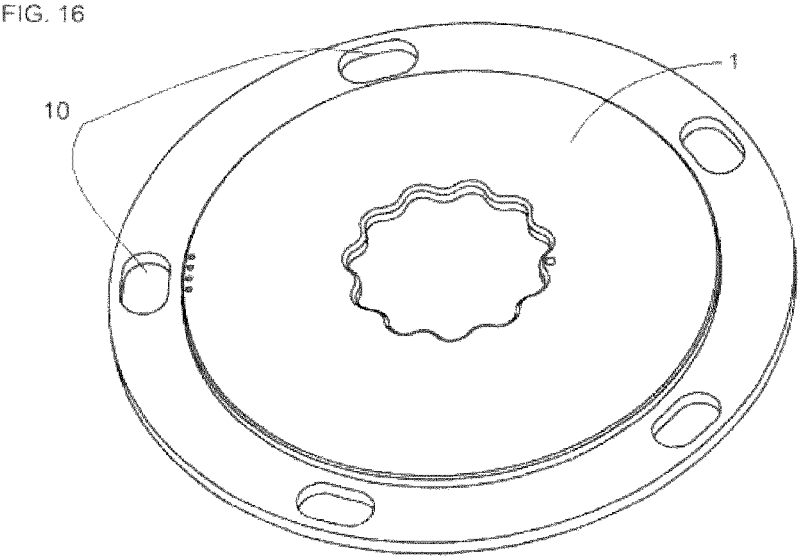
FIG. 16 shows a spider (1) where the anchorage points (10) are arranged as slotted holes instead of overlapped holes.

In the particular case of FIG. 16 the spider (1) is provided with spider anchorage points (10) arranged as 5 slotted holes located along a spider perimeter corresponding to a bolt circle in order to attach to an ovoid chainring (3) with 5 mechanical anchorage means (5).

Figure 17:
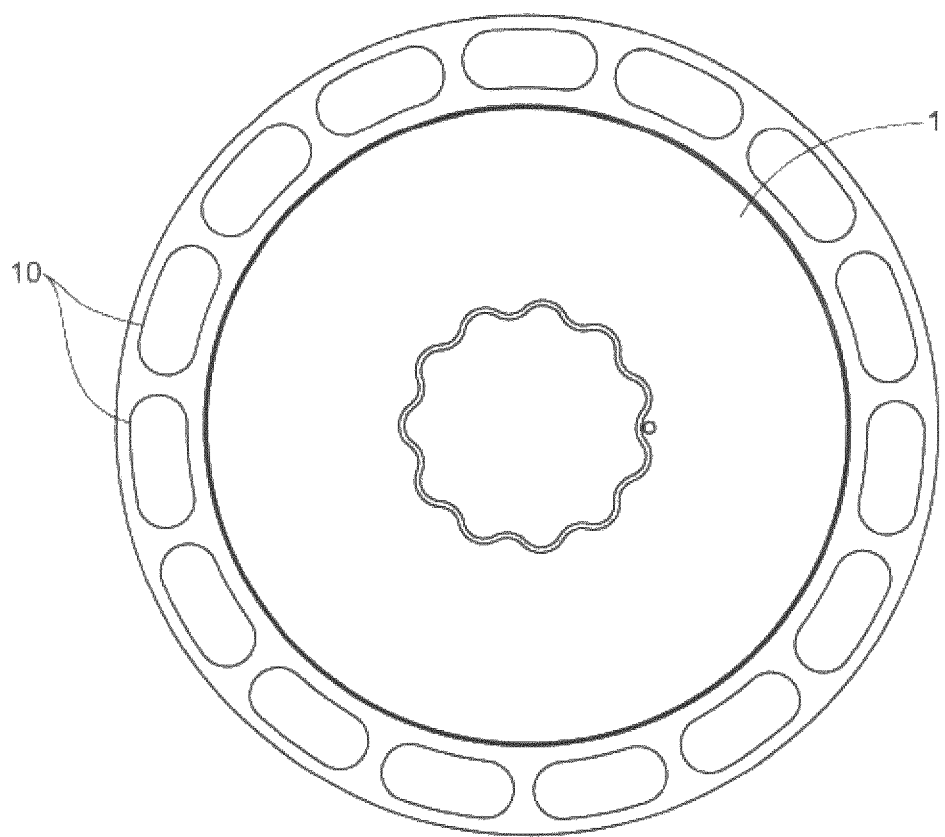
FIG. 17 shows another embodiment for a spider (1) where the anchorage points (10) are arranged as 15 slotted holes for attaching an ovoid chainring (3) provided with 5 chainring anchorage points (30), allowing to choose any orientation without limits on the angular range.

In the particular case shown in FIG. 17, where adjusting the orientation of ovoid chainrings (3) continuously and without limits within an angular range is required, in order to attach chainrings with 5 mechanical anchorage means (5), it is proposed a spider (1) provided with spider anchorage points (10) arranged as 15 slotted holes, each one of them ranging 12°.

The invention claimed is:

1. Crank arm spider adjustment orientation system to provide different angular orientations in the attachment of at least one ovoid chainring, consisting of, at least one ovoid chainring (3) having a major diameter, whose angle with a crank arm (2) measured in the pedaling direction defines its orientation, and provided with a plurality of chainring anchorage points (30) arranged as holes distributed along the perimeter corresponding to a chainring bolt circle diameter, in order to attach the ovoid chainring (3) to a crank arm (2) in a plurality of angular orientations;

a spider (1) coupled to said crank arm (2), provided with a plurality of spider anchorage points (10) arranged as holes distributed along the perimeter corresponding to a spider bolt circle diameter in order to attach an ovoid chainring (3) in a plurality of angular orientations;

and mechanical anchorage means (5) in order to make integral said ovoid chainring (3) with said spider (1), engaging chainring anchorage points (30) with corresponding spider anchorage points (10);

where the number of the chainring anchorage points (30) is multiple of and greater than the number of said mechanical anchorage means (5) so it can be defined some as original chainring anchorage points for attaching a spider (1), and the rest as alternative chainring anchorage points, so said alternative chainring anchorage points are located in an angular position different from 180° with respect to the mentioned original chainring anchorage points, providing multiple possibilities for the ovoid chainring's (3) orientation;

and where the number of said spider anchorage points (10) is multiple of and greater than the number of said mechanical anchorage means (5) so it can be defined some as original spider anchorage points (10) common to other conventional spiders, and the rest as alternative spider anchorage points (10), so said alternative spider anchorage points are located in an angular position different from 180° with respect to the mentioned original spider anchorage points, providing multiple possibilities for the ovoid chainring's (3) orientation;

characterized in that the angular increment between consecutive chainring's (3) orientations provided by the chainring anchorage points (30) is different from the angular increment between consecutive chainring's (3) orientations provided by the spider anchorage point (10), so the combination of the aforementioned spider (1) with said ovoid chainring (3) multiplies the possibilities for said ovoid chainring's (3) angular orientation, reducing the angular increment between consecutive angular orientations with respect to the crank arm (2).

2. Crank arm spider adjustment orientation system to provide different angular orientations in the attachment of at least one ovoid chainring (3) according to claim 1, characterized in that the angular increment between consecutive chainring's (3) orientations options is smaller than or equal to 3°.

3. Crank arm spider adjustment orientation system to provide different angular orientations in the attachment of at least one ovoid chainring (3) according to claim 2, characterized in that the spider anchorage points (10) that correspond to the same chainring anchorage point (30) are arranged in the spider (1) as slotted holes.

4. Crank arm spider adjustment orientation system to provide different angular orientations in the attachment of at least one ovoid chainring (3) according to claim 2, characterized in that the angular increment between consecutive chainring's (3) orientations options is smaller than or equal to 2°.

5. Crank arm spider adjustment orientation system to provide different angular orientations in the attachment of at least one ovoid chainring according to claim 4, characterized in that the angular increment between consecutive chainring's (3) orientations options is smaller than or equal to 1°.

6. Crank arm spider adjustment orientation system to provide different angular orientations in the attachment of at least one ovoid chainring (3) according to claim 5, characterized in that the spider anchorage points (10) that correspond to the same chainring anchorage point (30) are arranged in the spider (1) as slotted holes.

7. Crank arm spider adjustment orientation system to provide different angular orientations in the attachment of at least one ovoid chainring (3) according to claim 4, characterized in that the spider anchorage points (10) that correspond to the same chainring anchorage point (30) are arranged in the spider (1) as slotted holes.

8. Crank arm spider adjustment orientation system to provide different angular orientations in the attachment of at least one ovoid chainring according to claim 2, characterized in that the angular increment between consecutive chainring's (3) orientations options is smaller than or equal to 1°.

9. Crank arm spider adjustment orientation system to provide different angular orientations in the attachment of at least one ovoid chainring (3) according to claim 8, characterized in that the spider anchorage points (10) that correspond to the same chainring anchorage point (30) are arranged in the spider (1) as slotted holes.

10. Crank arm spider adjustment orientation system to provide different angular orientations in the attachment of at least one ovoid chainring (3) according to claim 1, characterized in that the spider anchorage points (10) that correspond to the same chainring anchorage point (30) are arranged in the spider (1) as slotted holes.

* * * * *